(12) United States Patent  
Ikeuchi et al.

(10) Patent No.: US 8,707,089 B2
(45) Date of Patent: Apr. 22, 2014

(54) STORAGE CONTROL DEVICE FOR FORMATTING TO STORAGE MEDIA, STORAGE CONTROL METHOD FOR FORMATTING TO STORAGE MEDIA, AND MEDIUM FOR STORING STORAGE CONTROL PROGRAM FOR FORMATTING TO STORAGE MEDIA

(75) Inventors: Kazuhiko Ikeuchi, Kawasaki (JP); Mikio Ito, Kawasaki (JP); Hidejirou Daikokuya, Kawasaki (JP); Chikashi Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/712,246

(22) Filed: Feb. 25, 2010

(65) Prior Publication Data

US 2010/0218038 A1  Aug. 26, 2010

(30) Foreign Application Priority Data

Feb. 26, 2009 (JP) .................................. 2009-43583

(51) Int. Cl.
*G06F 11/00* (2006.01)
(52) U.S. Cl.
USPC ........................................................ 714/6.22
(58) Field of Classification Search
USPC ............... 714/5, 6, 6.12, 6.13, 6.21, 6.22, 6.3
See application file for complete search history.

(56) References Cited

U.S. PATENT DOCUMENTS

| | | | |
|---|---|---|---|
| 6,442,604 B2 * | 8/2002 | Romine .......................... | 709/219 |
| 6,453,396 B1 * | 9/2002 | Boone et al. ................... | 711/162 |
| 6,795,895 B2 * | 9/2004 | Merkey et al. ................. | 711/114 |
| 7,467,279 B2 * | 12/2008 | Lahiri et al. ................... | 711/170 |
| 7,480,829 B2 * | 1/2009 | Dickenson et al. ............. | 714/42 |
| 7,562,249 B2 * | 7/2009 | Daikokuya et al. ............. | 714/6 |
| 7,594,137 B2 * | 9/2009 | Kawaguchi et al. ........... | 714/6.3 |
| 7,620,784 B2 * | 11/2009 | Panabaker ...................... | 711/157 |
| 7,725,760 B2 * | 5/2010 | Rowan et al. ................. | 714/5.11 |

(Continued)

FOREIGN PATENT DOCUMENTS

| JP | 1998-124261 A | 5/1998 |
|---|---|---|
| JP | 2000-132507 A | 5/2000 |

(Continued)

OTHER PUBLICATIONS

Japanese Office Action mailed Sep. 4, 2012 for corresponding Japanese Application No. 2009-043583, with English-language Translation.

*Primary Examiner* — Bryce Bonzo
*Assistant Examiner* — Elmira Mehrmanesh
(74) *Attorney, Agent, or Firm* — Fujitsu Patent Center

(57) ABSTRACT

A storage control device for managing data in a storage while maintaining redundancy of the data includes a formatting management table, a formatting processing section, a recovery management table and a recovery processing section. The formatting management table manages a formatted region and an unformatted region in a management target volume. The formatting processing section executes formatting of the unformatted region in the management target volume on the basis of the formatting management table. The recovery management table retains a content of the formatting management table at a point of occurrence of a redundancy restoration event when a redundancy restoration event has occurred during formatting. The recovery processing section executes recovery of a formatted region, which had been formatted at the point of occurrence of the redundancy restoration event, on the basis of the recovery management table in parallel with the formatting.

9 Claims, 5 Drawing Sheets

(56) References Cited

U.S. PATENT DOCUMENTS

| | | |
|---|---|---|
| 2003/0018851 A1 | 1/2003 | Ikeuchi |
| 2005/0246576 A1 | 11/2005 | Takayama |
| 2006/0212748 A1* | 9/2006 | Mochizuki et al. ............... 714/6 |
| 2007/0067667 A1* | 3/2007 | Ikeuchi et al. ................... 714/6 |
| 2007/0101187 A1* | 5/2007 | Daikokuya et al. ............. 714/6 |
| 2007/0233640 A1* | 10/2007 | Lahiri et al. ..................... 707/2 |
| 2010/0229033 A1* | 9/2010 | Maeda et al. ..................... 714/7 |

FOREIGN PATENT DOCUMENTS

| | | |
|---|---|---|
| JP | 2001-175422 A | 6/2001 |
| JP | 2003-29933 A | 1/2003 |
| JP | 2005-284980 A | 10/2005 |

* cited by examiner

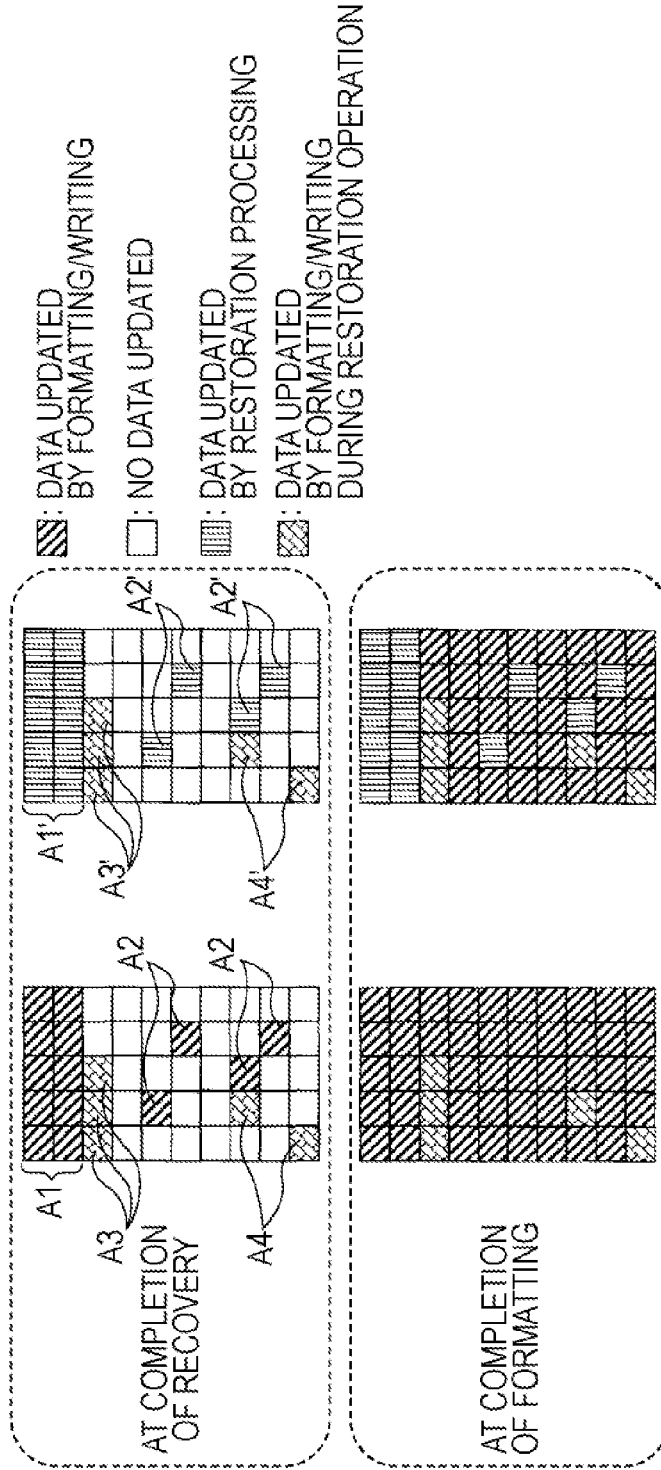
FIG. 3A AT DISK DEGENERATION
FIG. 3B AT COMPLETION OF RECOVERY
FIG. 3C AT COMPLETION OF FORMATTING

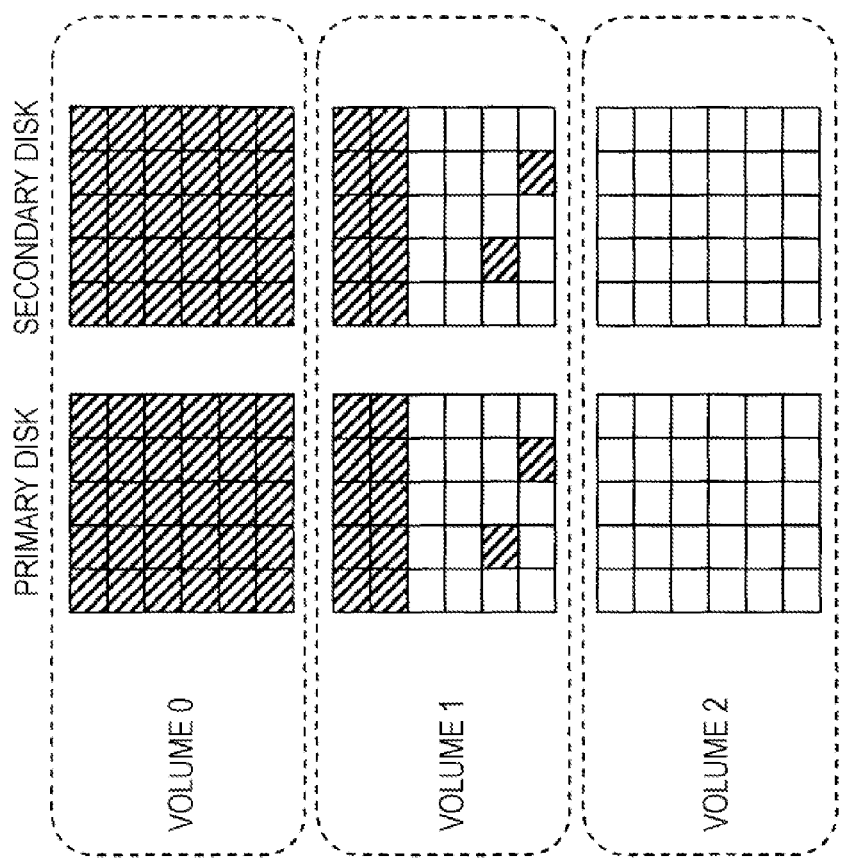
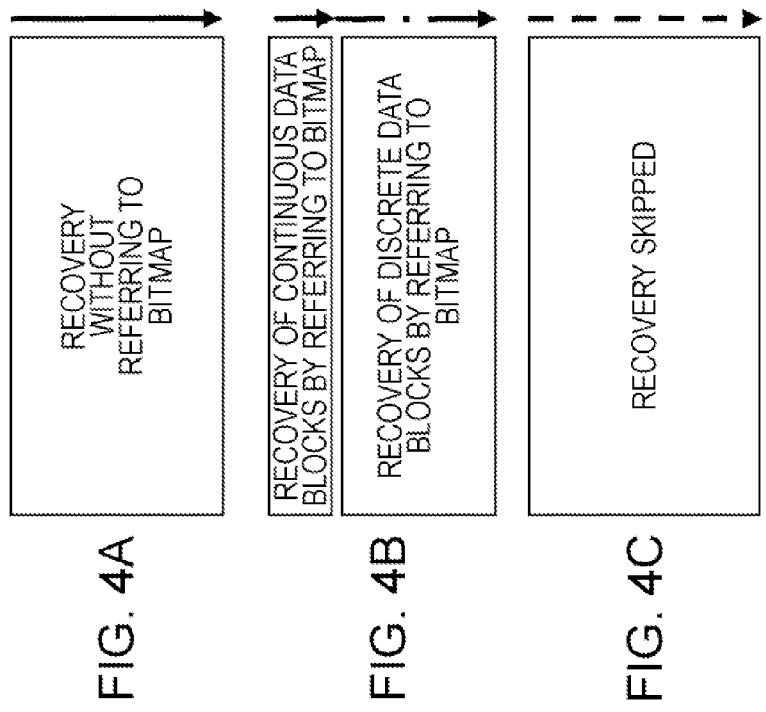
FIG. 4A  FIG. 4B  FIG. 4C

STORAGE CONTROL DEVICE FOR FORMATTING TO STORAGE MEDIA, STORAGE CONTROL METHOD FOR FORMATTING TO STORAGE MEDIA, AND MEDIUM FOR STORING STORAGE CONTROL PROGRAM FOR FORMATTING TO STORAGE MEDIA

CROSS-REFERENCE TO RELATED APPLICATIONS

This application is based upon and claims the benefit of priority of the prior Japanese Patent Application No. 2009-43583, filed on Feb. 26, 2009, the entire contents of which are incorporated herein by reference.

FIELD

The embodiments discussed herein relate to a technique for managing data in a storage apparatus.

BACKGROUND

Generally, in storage apparatuses such as those using a magnetic disk, a magneto-optical disk, or an optical disc, for example, an actual access to the storage medium is carried out in response to a request from a host such as a data processor. Therefore, in the storage apparatuses, formatting on the storage medium may be performed. Examples of such formatting may include physical formatting, such as count-key-data (CKD) formatting, and logical formatting. Logical formatting divides a data region into processing units, for example blocks, used by a host operating system (OS) and discriminates the blocks from one another. When the storage medium is formatted in this way, accesses such as read/write accesses to the storage medium, corresponding to host commands of the host OS are made possible.

When a volume is created in a storage apparatus (e.g. a disk array subsystem) upon a request being made by the host, a storage control device generally needs to ensure that data on a disk is in an initialized state. First, the storage control device executes physical formatting on the disk before logical formatting. In physical formatting, writing of zero data onto the target medium, for example, is carried out. For example, when the host requests creation of a certain amount of volume, two regions forming a pair, each in a different disk, are reserved for the volume in order to maintain redundancy of data. Then, physical formatting is performed sequentially from the beginning of the two volume regions forming a pair. At this time, physical formatting is simultaneously or substantially simultaneously performed for corresponding data blocks in the two volume regions forming a pair in order to maintain redundancy.

While the above-mentioned sequential physical formatting is executed, processing called quick formatting is also executed. Quick formatting enables an input/output (I/O) access to be made to a volume immediately after the host requests creation of the volume. This quick formatting is carried out by using a bitmap (quick formatting management table) indicating a formatted/unformatted state for each data block in the volume. In the bitmap, data blocks on which sequential physical formatting has been performed and data blocks on which quick formatting has been performed are registered as formatted data blocks.

When the storage control device receives an I/O access from the host during sequential physical formatting, the storage control device checks whether a data block that is to be subjected to the I/O access has been formatted or not by referring to the aforementioned bitmap. If the data block has been formatted, the storage control device immediately executes the I/O access thereto. If the data block has not been formatted, the storage control device preferentially executes physical formatting, that is quick formatting, on the data block that is to be subjected to the I/O access rather than sequential physical formatting. Upon the completion of such quick formatting, the data block is registered in the aforementioned bitmap as a formatted data block and the I/O access thereto is executed.

By executing the above-mentioned formatting processing, each of the two volume regions forming a pair is formatted as shown in FIG. 5. In FIG. 5, blocks with diagonal lines correspond to formatted data blocks in each region and blank blocks correspond to unformatted data blocks in each region. In addition, the formatted data blocks in a region A1 in FIG. 5 are data blocks that have been formatted by sequential physical formatting, and the formatted data blocks located in a region A2 in FIG. 5 are data blocks that have been formatted by quick formatting.

When a disk containing one of the two volume regions forming a pair has failed during the above-mentioned formatting processing and has been replaced with a spare disk or a new disk, the following recovery processing is executed. Hereinafter, the disk that has not failed is referred to as the "primary disk" and the disk used to replace the failed disk is referred to as the "secondary disk".

That is, in the recovery processing, the content of the primary disk is copied to the secondary disk to maintain redundancy. This recovery processing is executed following the sequential formatting performed in the primary disk. For example, after the region A1 in FIG. 5 is recovered in the secondary disk, whenever the sequential formatting processing is executed on data blocks that follow the region A1 in the primary disk, the recovery processing for the corresponding data blocks is executed in the secondary disk.

When formatting processing and recovery processing conflict with each other due to failure of a disk during the formatting processing of the disk, the recovery processing is executed following the sequential formatting processing. Therefore, the recovery processing will be completed after the completion of the sequential formatting processing for all the regions in a target volume. That is, redundancy is restored after the completion of the sequential formatting processing for all the regions of the target volume, and thus it takes time to restore redundancy. In other words, the sequential formatting processing and the recovery processing is not performed at the same time or in parallel.

SUMMARY

According to an aspect of the invention, a storage control device for managing data in a storage while maintaining redundancy of the data includes a formatting management table, a formatting processing section, a recovery management table and a recovery processing section. The formatting management table manages a formatted region and an unformatted region in a management target volume that is to be managed. The formatting processing section executes formatting of the unformatted region in the management target volume on the basis of the formatting management table. The recovery management table retains a content of the formatting management table at a point of occurrence of a redundancy restoration event when a redundancy restoration event has occurred during formatting being executed by the formatting processing section. The recovery processing section executes recovery of a formatted region, which had been formatted at the point of occurrence of the redundancy restoration event, on the basis of the recovery management table in parallel with the formatting being executed by the formatting processing section.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3A is a diagram for explaining a recovery operation and a formatting operation of each of the storage control devices shown in FIG. 2.

FIG. 3B is a diagram for explaining a recovery operation and a formatting operation of each of the storage control devices shown in FIG. 2.

FIG. 3C is a diagram for explaining a recovery operation and a formatting operation of each of the storage control devices shown in FIG. 2.

FIG. 4A is a diagram for explaining the recovery operation of each of the storage control devices shown in FIG. 2.

FIG. 4B is a diagram for explaining the recovery operation of each of the storage control devices shown in FIG. 2.

FIG. 4C is a diagram for explaining the recovery operation of each of the storage control devices shown in FIG. 2.

DESCRIPTION OF EMBODIMENTS

A description of an embodiment of the present invention is provided below with reference to the drawings.

[1] Configuration of the Present Embodiment

Figure 1:
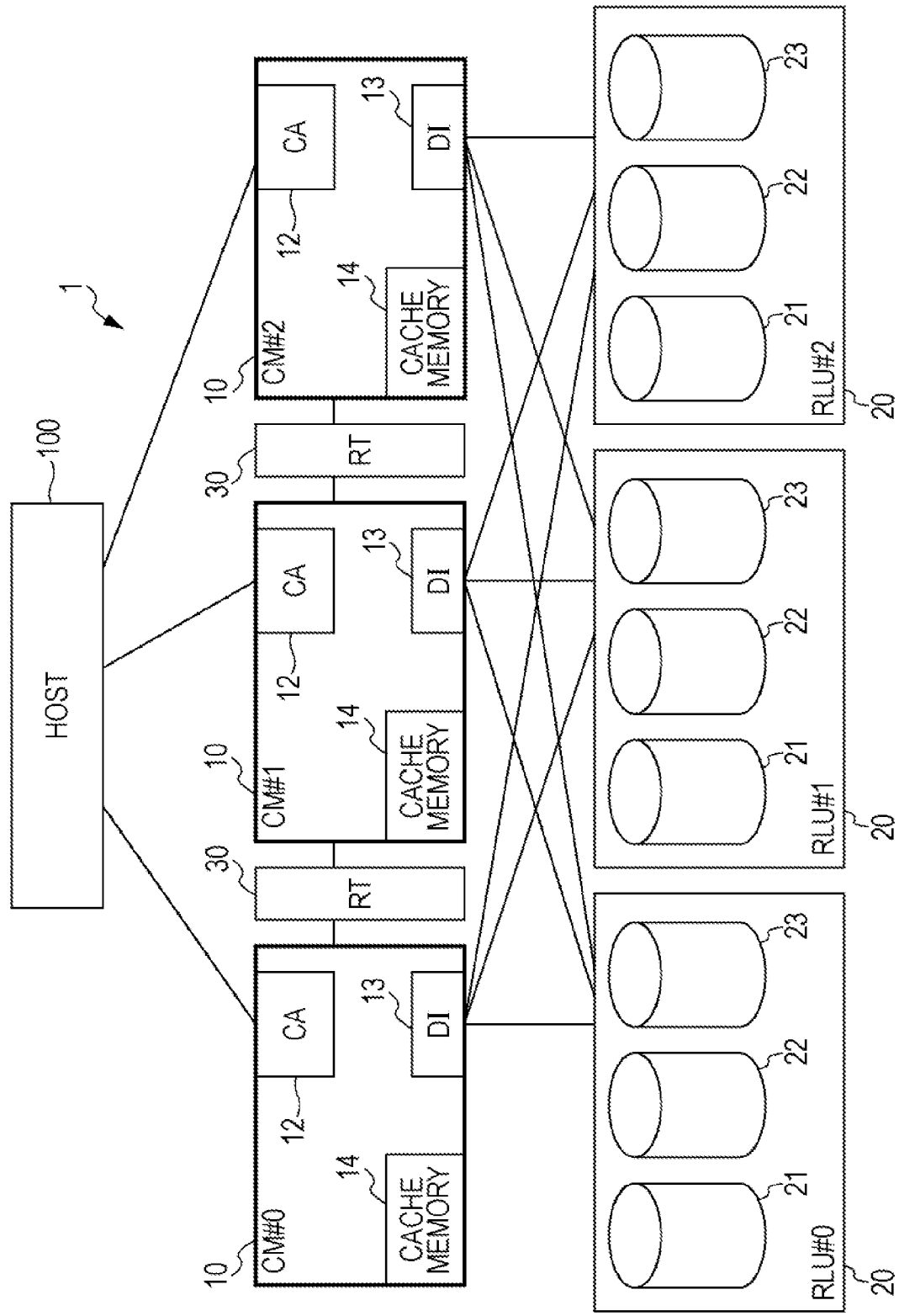
FIG. 1 is a block diagram showing the overall configuration of a storage system (disk array subsystem) in which a storage control device of an embodiment is applied.

First, the overall configuration of a storage system (disk array subsystem) 1 in which a storage control device 10 of the present embodiment is described with reference to FIG. 1 is provided. FIG. 1 is a block diagram showing the overall configuration of the storage system 1.

The storage system 1 of the present embodiment is a RAID (Redundant Array of Inexpensive Disks) system using physical disks such as magnetic disks, magneto-optical disks or optical discs, for example. As shown in FIG. 1, the storage system 1 is accessed from a host (higher-level device) 100 and has a plurality of storage control devices 10 interconnected with one another via routers (RT) 30. Further, the storage system includes a plurality of storages 20 managed by the storage control devices 10.

The storage system 1 shown in FIG. 1 includes three storage control devices 10 and three storages 20. In FIG. 1, the three storage control devices 10 are respectively denoted as CM#0, CM#1 and CM#2 (CM is an abbreviation for Centralized Module), and the three storages 20 are respectively denoted as RLU#0, RLU#1 and RLU#2 (RLU is an abbreviation for RAID group Logical Unit). Each of the RLUs 20 includes three physical disks 21, 22 and 23.

Each CM 10 is disposed between the host 100 and the three corresponding RLUs 20. The CM 10 executes access control for each of the RLUs 20 according to an I/O access from the host 100 and manages data of the RLU 20 while maintaining redundancy of the data.

Figure 2:
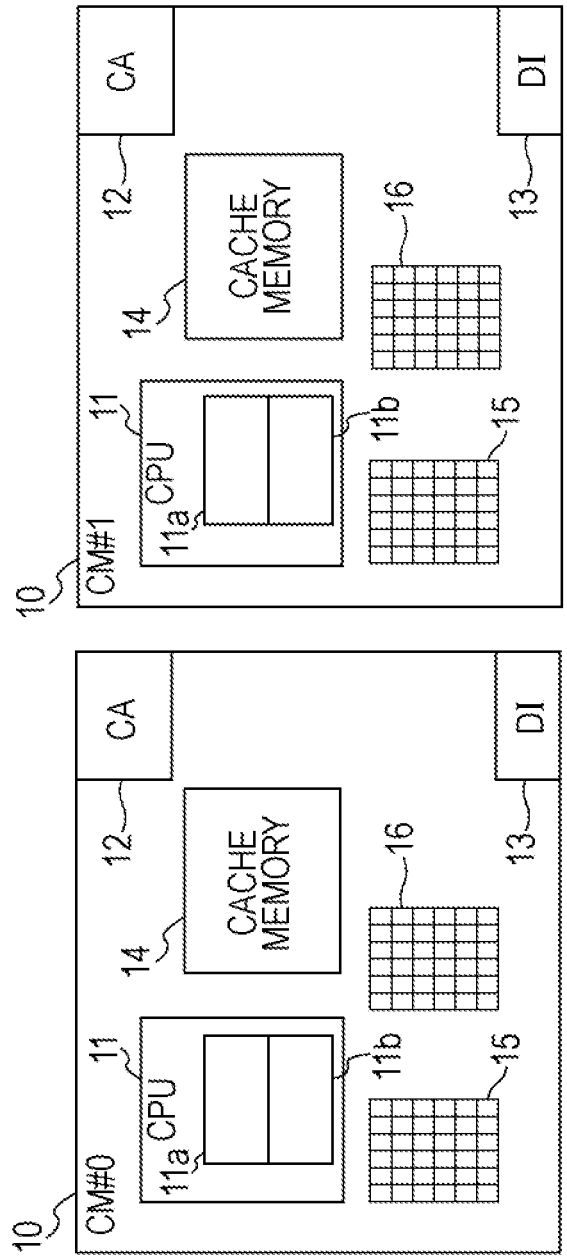
FIG. 2 is a block diagram showing the functional configuration of storage control devices of the embodiment which are applied in the storage system shown in FIG. 1.
Figure 5:
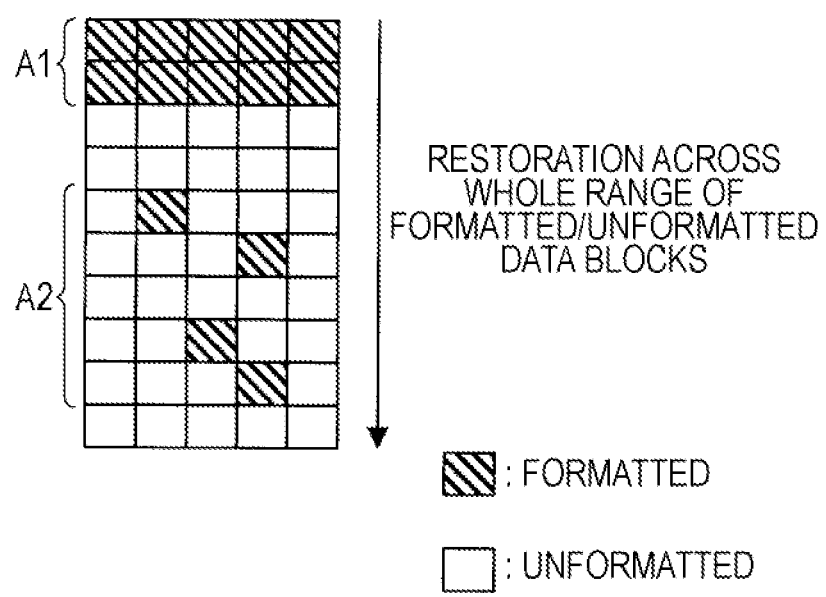
FIG. 5 is a diagram for explaining general quick formatting processing and conventional recovery processing.

Next, the functional configuration of each of the CMs 10, which are applied in the storage system 1 shown in FIG. 1, is described with reference to FIGS. 1 and 2. FIG. 2 is a block diagram showing the functional configuration of the CMs 10. In FIG. 2, the configuration of two CMs (CM#0 and CM#1) out of the three CMs 10 is illustrated, but the remaining CM, CM#2, is also configured in the same way as the CMs 10 shown in FIG. 2.

As shown in FIGS. 1 and 2, each CM 10 has a CPU 11, a channel adaptor (CA) 12, a device interface (DI) 13, a cache memory 14, a quick formatting management table 15 and a recovery management table 16. In the CM 10, the CPU (processing section) 11 executes application programs or the like so as to serve as a formatting processing section 11a and a recovery processing section 11b, which are described later in this document.

The CA 12 controls a host interface that connects the CM 10 and the host 100. The DI 13 controls a device interface that connects the CM 10 and each RLU 20.

The cache memory 14 temporarily retains data that is to be subjected to an I/O access received from the host 100 via the CA 12. When a writing access is received from the host 100, data to be written is temporality retained in the cache memory 14 and then written into a volume in one of the RLUs 20 through the DI 13. The volume may be a predetermined volume. When a reading access is received from the host 100, data to be read is read from a volume through the DI 13, temporarily retained in the cache memory 14 and then read to the host 100 through the CA 12. The volume may be a predetermined volume.

The quick format (QF) management table 15 and the recovery management table 16 are created for each volume in the RLUs 20, which are managed by the CM 10. The quick formatting management table 15 and the recovery management table 16 may be created in a storage section such as a random access memory (RAM) included in the CM 10 or in the cache memory 14.

The QF management table 15 is a bitmap that manages formatted regions/unformatted regions in a volume that is to be managed (such a volume is hereinafter referred to as a management target volume). The formatting processing section 11a, which is realized by the CPU 11, executes formatting on the unformatted regions in the management target volume on the basis of this QF management table 15. More specifically, this formatting processing section 11a carries out sequential physical formatting along with quick formatting.

That is, when the formatting processing section 11a creates a new volume in a RLU 20 in response to a request from the host 100, the formatting processing section 11a first executes physical formatting on disks to ensure that the data on the disks is in an initialized state. At that time, two regions forming a pair, each on a different disk, are reserved for the volume in order to maintain redundancy of the data, and the formatting processing section 11a carries out physical formatting on the regions sequentially from the beginning thereof.

The formatting processing section 11a executes the sequential physical formatting described above and further executes quick formatting so that an I/O access to the volume is made possible substantially immediately after the host 100 has requested creation of the volume. This quick formatting is carried out by using the QF management table 15, which is a bitmap that indicates the formatted/unformatted state for each data block in the volume. In the QF management table 15, data blocks on which sequential physical formatting has been performed and data blocks on which quick formatting has been performed by the format processing section 11a are registered as formatted data blocks.

When the formatting processing section 11a receives an I/O access from the host 100 during the sequential physical formatting, the formatting processing section 11a checks whether a data block that is to be subjected to the I/O access has been formatted or not by referring to the QF management table 15. If the data block has been formatted, the I/O access thereto is substantially immediately executed. If the data block has not been formatted, the formatting processing section 11a preferentially executes physical formatting, that is quick formatting, on the data block that is to be subjected to the I/O access rather than sequential physical formatting. Upon the completion of quick formatting, the data block is registered as a formatted data block in the QF management table 15 by the formatting processing section 11a, and the I/O access thereto is executed.

The recovery management table 16 is a bitmap that retains the content of the QF management table 15 at the point of occurrence of a redundancy restoration event when a redundancy restoration event occurs during the above-mentioned formatting performed by the formatting processing section 11a. Such redundancy restoration events may include an event where due to degeneration failure or the like of a disk containing one of the two volume regions forming a pair, the disk needs to be replaced by a spare disk or a new disk.

In the recovery management table 16, the content of the QF management table 15 at the point when formatting by the formatting processing section 11a is temporarily stopped due to, for example, occurrence of the disk failure described above, is copied. This copy processing may be realized by the function of the formatting processing section 11a or the recovery processing section 11b of the CPU 11 or may be realized by another function of the CPU 11. That is, in the recovery management table 16, information of formatted regions (formatted data blocks) on which formatting has been completed before the disk failure occurs is stored.

The recovery processing section 11b realized by the CPU 11 executes recovery processing, which will be described later, so as to restore the data redundancy after replacement of the disk as described later with reference to FIGS. 3A and 3B. More specifically, the recovery processing section 11b executes recovery of the regions that had been formatted at the point of occurrence of a redundancy restoration event on the basis of the recovery management table 16, in parallel with the above-mentioned formatting processing performed by the formatting processing section 11a. That is, the recovery processing section 11b is adapted to execute recovery of only the regions that had been formatted at the point of occurrence of disk failure, in parallel with the formatting processing performed by the formatting processing section 11a.

The recovery processing section 11b may have the following functions (a) to (c) in addition to a function that executes the above-mentioned basic recovery processing. (a) When the recovery processing section 11b refers to the recovery management table 16 and recognizes that a plurality of recovery target region units (data blocks) to be subjected to recovery exist continuous to one another, the recovery processing section 11b requests a RLU 20 to perform recovery of these data blocks by issuing a single command. That is, when a continuous plurality of data blocks in a single volume are to be subjected to recovery, the recovery processing section 11b does not carry out recovery processing by issuing a command for each data block but carries out recovery processing for the plurality of data blocks collectively by using a single command. This function (a) is described later in this document with reference to FIG. 4B.

(b) In the case where the management target volume includes a plurality of volume regions, when the recovery processing section 11b refers to the recovery management table 16 for each volume region and recognizes that all regions within the volume region have been formatted, the recovery processing section 11b executes recovery of the volume region without referring to the recovery management table 16 for each recovery target region unit. That is, when the recovery processing section 11b recognizes that all regions in a certain volume are to be subjected to recovery, the recovery processing section 11b executes recovery processing (copy processing) for all the regions in the volume without referring to the recovery management table 16 for each region. This function (b) is described later in this document with reference to FIG. 4A.

(c) In the case where the management target volume includes a plurality of volume regions, when the recovery processing section 11b refers to the recovery management table 16 for each volume region and recognizes that all the regions within the volume region have not been formatted, the recovery processing section 11b skips recovery of the volume region. That is, when no data block to be subjected to recovery exists in a certain volume, the recovery processing section 11b skips the recovery processing. This function (c) is described later in this document with reference to FIG. 4C.

[2] Operation of the Present Embodiment

Operations of the storage system 1 and the CMs 10 configured as described above is described below with reference to FIGS. 3A to 3C. FIGS. 3A to 3C are diagrams (update images of RAID 1 data) for explaining the recovery operation and the formatting operation of the CMs 10 shown in FIG. 2.

Described in the following is recovery processing for a case where, for example, disk failure occurred at a point when the formatting processing section 11a was executing the sequential physical formatting processing along with quick formatting and when the formatting processing had been completed up until the disk became of the state shown in the left portion of FIG. 3A. It is assumed that the failed disk was replaced by a spare disk or a new disk after the disk failure occurred, as shown in the right portion of FIG. 3A. Hereinafter, the disk that has not failed is called the "primary disk" and the disk used to replace or as a substitute for the failed disk is referred to as the "secondary disk".

At the point of occurrence of the disk failure, the content of the QF management table 15 indicating the state of the formatted regions in the primary disk at that point is copied and stored in the recovery management table 16. Here, the state as shown in the primary disk on the left portion of FIG. 3A is stored in the recovery management table 16. In the primary disk on the left portion of FIG. 3A, sequential formatting has been performed for ten data blocks in a region A1 and quick formatting has been performed for four data blocks A2. At this point, the secondary disk on the right portion of FIG. 3A has just been replaced and no data has been recovered yet.

The content of the QF management table 15 is stored in the recovery management table 16. Upon the completion of the disk replacement, the formatting processing to be executed by the formatting processing section 11a is resumed. In parallel with this formatting processing, recovery processing to be executed by the recovery processing section 11b is also started. That is, formatting processing performed by the formatting processing section 11a and recovery processing performed by the recovery processing section 11b are performed concurrently.

At that time, the formatting processing section 11*a* executes, as with the above-mentioned case, sequential physical formatting along with quick formatting for each volume in the primary disk and the secondary disk. At the same time, the recovery processing section 11*b* of the present embodiment executes recovery only for the regions that had been formatted at the point of occurrence of the disk failure while referring to the formatted regions stored in the recovery management table 16.

One example of a state where formatting processing and recovery processing are concurrently executed respectively by the formatting processing section 11*a* and the recovery processing section 11*b* as described above is shown in FIG. 3B. In this case, data blocks A1' and A2' in the secondary disk corresponding respectively to the data blocks A1 and A2 in the primary disk are recovered as shown in FIG. 3B by causing the recovery processing section 11*b* to execute the recovery processing while referring to the recovery management table 16.

While these data blocks A1' and A2' are being recovered, the formatting processing section 11*a* executes formatting processing concurrently. Therefore, during this recovery period, in the example shown in FIG. 3B, the formatting processing section 11*a* performs sequential physical formatting for three data blocks A3 in the primary disk. Also in this primary disk, quick formatting responsive to an I/O access from the host 100 is performed for two data blocks A4.

Such formatting processing by the formatting processing section 11*a* is performed not only on the primary disk but also on the secondary disk. That is, the formatting processing is performed also on data blocks A3' and A4' in the secondary disk corresponding to the data blocks A3 and A4 in the primary disk.

As shown in FIG. 3B, at the time the data blocks A1 and A2 (A1' and A2') are recovered, the restoration of data redundancy will be completed for the regions A3 and A4 (A3' and A4') for which the formatting processing has been completed after the start of the recovery processing. That is, the primary disk and the secondary disk become the same state and data redundancy is maintained, and thus the recovery processing on the disk is completed.

After the completion of the recovery processing on the disk, as shown in FIG. 3B, the formatting processing section 11*a* executes sequential physical formatting along with quick formatting. Then, formatting processing is performed on all the regions in the volume, as shown in FIG. 3C, and the formatting processing section 11*a* completes the formatting.

In the case where there exist a plurality of volumes within a RAID group of a RLU 20, that is, in the case where a management target volume includes a plurality of volume regions, the following recovery operations can be carried out by the above-mentioned functions (a) to (c) of the recovery processing section 11*b*. FIGS. 4A to 4C are diagrams for explaining those recovery operations. FIGS. 4A to 4C show a case where a management target volume includes three volumes 0, 1 and 2.

As shown in FIG. 4A, when it is recognized by using the aforementioned function (b) of the recovery processing section 11*b* that all regions in a certain volume (volume 0 in this case) are to be subjected to recovery, recovery processing is executed for all the regions in the volume without referring to the recovery management table (bitmap) 16 for each region. Therefore, unnecessary control referring to the table 16 is eliminated, thereby contributing to the speeding up of the recovery processing.

As shown in FIG. 4B, in the case where a continuous plurality of data blocks in a volume (volume 1 in this case) are to be subjected to recovery, the aforementioned function (a) of the recovery processing section 11*b* carries out recovery processing on the plurality of data blocks collectively by issuing a single command. That is, recovery processing is carried out collectively for continuously arranged data blocks instead of carrying out recovery processing by issuing a command for each data block, thereby contributing to an increase in the speed of the recovery processing. For the portions in which data blocks to be subjected to recovery are arranged discontinuously, the recovery processing section 11*b* executes recovery processing for each discrete data block as usual.

As shown in FIG. 4C, in the case where there exists no data block to be subjected to recovery within a certain volume (volume 2 in this case), the recovery processing is skipped by using the aforementioned function (c) of the recovery processing section 11*b*. Therefore, unnecessary control referring to the table 16 is eliminated, thereby contributing to an increase in the speed of the recovery processing.

[3] Effects of the Present Embodiment

As described above, according to the present embodiment, in the case where formatting processing and recovery processing conflict with each other due to failure of a disk during the formatting processing on the disk, the content of the QF management table 15 at the point of occurrence of the disk failure is stored in the recovery management table 16 as formatted-state information. The recovery processing section 11*b* then executes recovery processing only for the regions that had been formatted at the time the disk failure occurred, on the basis of the content of the recovery management table 16.

Therefore, in the present embodiment, only the regions that had been formatted at the time a redundancy restoration event such as occurrence of disk failure occurred are subjected to recovery, and the regions that had not been formatted at that time are not subjected to recovery. Thus, compared to the recovery technique of the related art, the present embodiment markedly reduces the number of recovery target regions and thereby reduces and/or eliminates unnecessary recovery processing. As a result, when formatting processing and recovery processing conflict with each other, the recovery processing is carried out within an extremely short time, and thus redundancy of data can be secured within a short time. In addition, an advantage can also be obtained, in that the period of response delay to an I/O access associated with conflicting operations is shortened.

Further, as mentioned above referring to FIGS. 4A to 4C, it is possible to realize further speeding up of recovery processing by using the aforementioned functions (a) to (c) of the recovery processing section 11*b*.

[4] Others

The present disclosure is not limited to the above-mentioned embodiment and can be modified in various forms within the scope of the present disclosure. For example, in the above-mentioned embodiment, a case where the storage system 1 includes three CMs 10 and three RLUs 20, each of the RLUs 20 having three physical disks 21 to 23 is described, but the present disclosure is not limited to this configuration.

Further, all or part of the functions of the formatting processing section 11*a* and the recovery processing section 11*b* described above may be realized by a computer having a CPU, an information processing device, and various terminals therein by executing a application program (storage control program).

The program is recorded and provided in the form of a computer-readable recording medium, for example, a flexible disk, a CD (such as a CD-ROM, a CD-R, or a CD-RW) or a DVD (such as a DVD-ROM, a DVD-RAM, a DVD-R, a DVD-RW, a DVD+R, a DVD+RW, or a blue-ray disc). For example, the computer reads the program from the recording medium, transfers the program to an internal storage device or an external storage device, and then stores the program in the device before using the program. In addition, the program may be recorded in a storage device (recording medium) such as a magnetic disk, an optical disc, or a magneto-optical disk and provided to the computer via a communication line from the storage device.

Here, the computer is a concept including hardware and an OS and means hardware that operates under control of the OS. If an OS is not needed and the application program alone operates hardware, the hardware itself corresponds to a computer. The hardware includes at least a microprocessor, such as a CPU, and means for reading a computer program recorded in a recording medium. The aforementioned program includes program codes that cause the above-mentioned computer to realize the functions of the formatting processing section 11a and the recovery processing section 11b. Part of the functions may be realized by the OS, instead of the application program.

In the technique disclosed in this specification, only regions that had been formatted at the time a redundancy restoration event occurs are to be subjected to recovery and regions that have not been formatted at that time are not subjected to recovery. Therefore, when formatting processing and recovery processing conflict with each other, the recovery processing is carried out within a short time, and thus the redundancy of data is secured within a short time. In addition, the period of response delay associated with conflicting operations is shortened.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage control device for managing data in a storage while maintaining redundancy of the data, the storage control device comprising:
    a processor;
    a memory which stores a plurality of instructions, which when executed by the processor, cause the processor to execute,
    managing, based on a formatting management table stored in the storage, a formatted region and an unformatted region in a management target volume to be managed;
    formatting of the unformatted region in the management target volume on the basis of the formatting management table;
    retaining, in a recovery management table stored in the storage, a content of the formatting management table at a point of a failure of a formatted disk when the failure of the disk has occurred during formatting recovering, in parallel with the formatting, a formatted region, which had been formatted at a point of occurrence of a redundancy restoration event, on the basis of the recovery management table; and
    determining whether a plurality of recovery target region units to be recovered are continuous with one another,
    wherein in a case where the management target volume includes a plurality of volume regions, when the recovery processing section refers to the recovery management table for each volume region and recognizes that all regions within the volume region have not been formatted, the recovery processing section skips recovery of the volume region.

2. The storage control device according to claim 1, wherein when the recovery processing section references the recovery management table, the recovery processing section requests the storage to execute recovery of the plurality of recovery target region units by issuing a single command.

3. The storage control device according to claim 1, wherein in a case where the management target volume includes a plurality of volume regions, when the recovery processing section refers to the recovery management table for each volume region and recognizes that all regions within the volume region have been formatted, the recovery processing section executes recovery of the volume region without referring to the recovery management table for each recovery target region unit to be subjected to recovery.

4. A storage control method in which a processing section manages data in a storage while maintaining redundancy of the data, the storage control method comprising:
    managing, based on a formatting management table stored in a storage section, a formatted region and an unformatted region in a management target volume to be managed;
    executing, with the processing section, formatting of the unformatted region in the management target volume on the basis of the formatting management table;
    retaining, in a recovery management table stored in the storage section, a content of the formatting management table at a point of a failure of a formatted disk when the failure of the disk has occurred during the formatting;
    executing, with a processing section, in parallel with the formatting, recovery of a formatted region, which had been formatted at a point of occurrence of a redundancy restoration event, on the basis of the recovery management table; and
    determining whether a plurality of recovery target region units to be recovered are continuous with one another,
    wherein in a case where the management target volume includes a plurality of volume regions, when, in the recovery, the processing section refers to the recovery management table for each volume region and recognizes that all regions within the volume region have not been formatted, the processing section skips recovery of the volume region.

5. The storage control method according to claim 4, wherein when, in the recovery, the processing section references the recovery management table, the processing section requests the storage to execute recovery of the plurality of recovery target region units by issuing a single command.

6. The storage control method according to claim 4, wherein in a case where the management target volume includes a plurality of volume regions, when, in the recovery, the processing section refers to the recovery management table for each volume region and recognizes that all regions within the volume region have been formatted, the processing section executes recovery of the volume region without referring to the recovery management table for each recovery target region unit to be subjected to recovery.

7. A non-transitory computer-readable recording medium encoded with a computer-executable storage control program for causing a computer to manage data in a storage while maintaining redundancy of the data, execution of the storage control program causing the computer to execute:

formatting, on the basis of a formatting management table for managing a formatted region and an unformatted region in a management target volume that is to be managed, the unformatted region in the management target volume;

recovering, in parallel with the formatting, a formatted region, which had been formatted at a point of occurrence of a redundancy restoration event, on the basis of a recovery management table for retaining a content of the formatting management table at a point of a failure of a formatted disk when the failure of the disk occurs during the formatting; and determining whether a plurality of recovery target region units to be recovered are continuous with one another, wherein in a case where the management target volume includes a plurality of volume regions, when the recovery management table is referred to for each volume region and it is recognized that all regions within the volume region have not been formatted, the recovering includes skipping recovery of the volume region.

8. The computer-readable recording medium according to claim 7, wherein the recovering includes requesting the storage to execute recovery of a plurality of recovery target region units to be recovered by issuing a single command when the recovery management table is referenced.

9. The computer-readable recording medium according to claim 7, wherein in a case where the management target volume includes a plurality of volume regions, when the recovery management table is referred to for each volume region and it is recognized that all regions within the volume region have been formatted, the recovering includes executing recovery of the volume region without referring to the recovery management table for each recovery target region unit to be recovered.

\* \* \* \* \*